(12) United States Patent
Tai et al.

(10) Patent No.: US 7,990,744 B2
(45) Date of Patent: *Aug. 2, 2011

(54) POWER SUPPLY SAVING SYSTEM FOR AN ELECTRONIC DEVICE

(75) Inventors: Fang-Ta Tai, Taipei Hsien (TW);
Chen-Hsiang Lin, Taipei Hsien (TW);
Teng-Feng Zou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 252 days.

This patent is subject to a terminal disclaimer.

(21) Appl. No.: 12/331,415

(22) Filed: Dec. 9, 2008

(65) Prior Publication Data
US 2010/0103708 A1    Apr. 29, 2010

(30) Foreign Application Priority Data
Oct. 29, 2008  (CN) .......................... 2008 1 0305268

(51) Int. Cl.
*H02M 7/00*   (2006.01)
*H01H 47/00*  (2006.01)

(52) U.S. Cl. ....................... 363/125; 361/139
(58) Field of Classification Search ............. 363/84, 363/89, 125, 127; 361/139, 160, 170, 189, 361/190; 713/300, 320, 323, 324, 330
See application file for complete search history.

(56) References Cited

U.S. PATENT DOCUMENTS

| | | | | |
|---|---|---|---|---|
| 4,350,337 A * | 9/1982 | Knauer et al. | ............... | 473/66 |
| 5,812,386 A * | 9/1998 | Youn | ............... | 363/86 |
| 6,515,379 B1 * | 2/2003 | Nojima et al. | ............... | 307/64 |
| 7,523,328 B2 * | 4/2009 | Seo | ............... | 713/320 |
| 2009/0230781 A1 * | 9/2009 | Hung et al. | ............... | 307/140 |

* cited by examiner

*Primary Examiner* — Matthew V Nguyen
(74) *Attorney, Agent, or Firm* — Zhigang Ma

(57) ABSTRACT

A power supply saving system includes a power input interface, a power output interface, an alternating current/direct current (AC/DC) converter, a relay, a relay driving circuit, a trigger, and a timing sequence circuit. The AC/DC converter is capable of transforming the AC power signal to direct current (DC) power to supply to the relay, the relay driving circuit, the trigger, and the timing sequence circuit. The timing sequence circuit is capable of controlling the relay driving circuit via the trigger to turn on the relay to connect the power input interface to the power output interface when the timing sequence circuit receives a power-on signal. The timing sequence circuit is capable of controlling the relay driving circuit via the trigger to turn off the relay to cut off connection between the power input interface and the power output interface when the timing sequence circuit receives a power-off signal.

13 Claims, 2 Drawing Sheets

POWER SUPPLY SAVING SYSTEM FOR AN ELECTRONIC DEVICE

BACKGROUND

1. Technical Field

The present disclosure relates to power supply saving systems and more particularly to a power supply saving system for an electronic device.

2. Description of the Related Art

Nowadays, power supplies are widely used in electronic devices, such as computers. When a computer is turned off via software, a power supply in the computer still outputs a standby voltage to the motherboard of the computer for turning on the computer quickly the next time. However, if the computer is not used for a long time, the standby voltage is wasted.

What is desired, therefore, is to provide a power supply saving system which overcomes the above problem.

DETAILED DESCRIPTION

Figure 1:
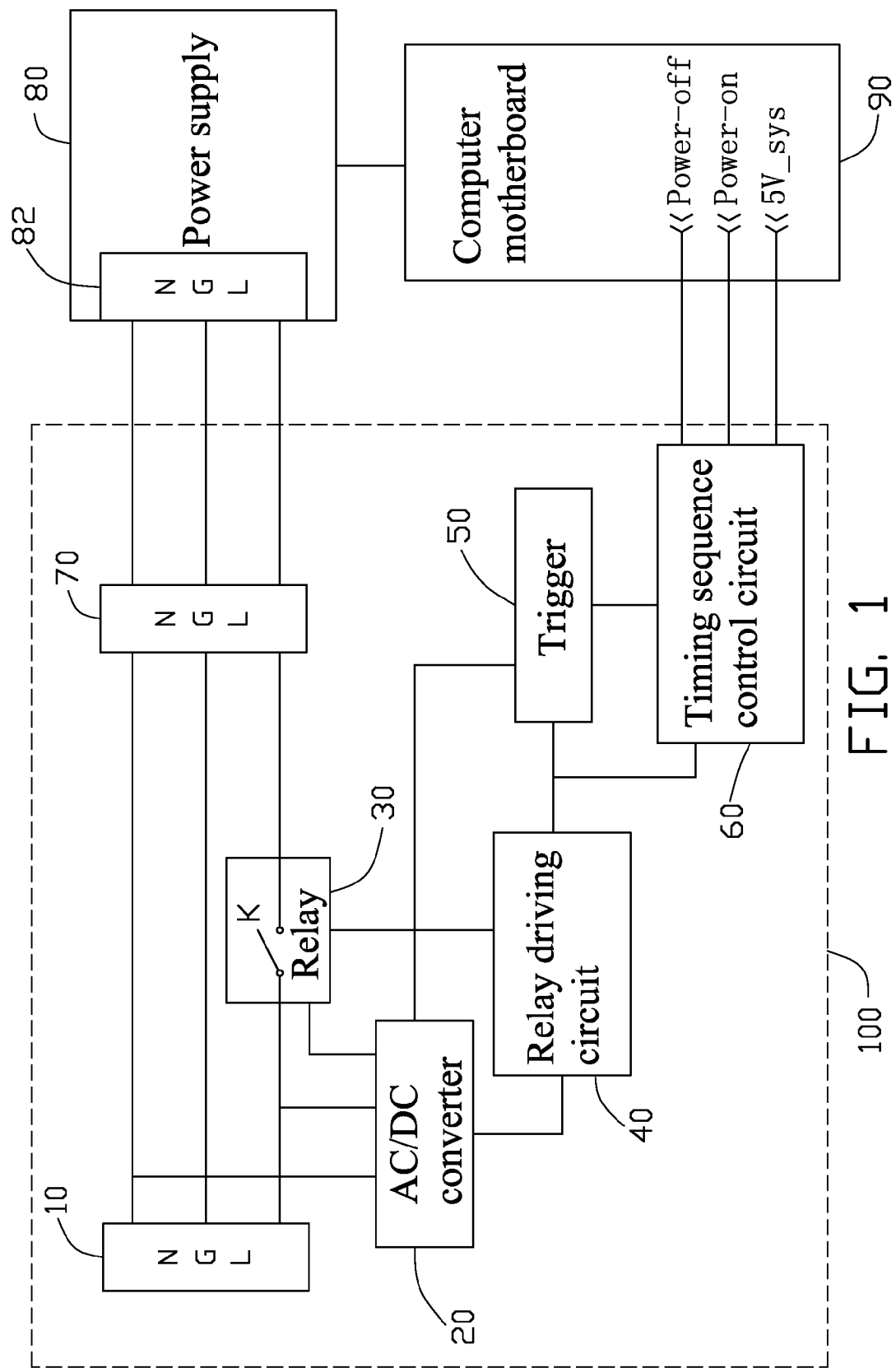
FIG. 1 is a block diagram of an exemplary power supply saving system connected between a power supply and a computer motherboard.

Referring to FIG. 1, an exemplary power supply saving system 100 includes a power input interface 10, an alternating current/direct current (AC/DC) converter 20, a relay 30, a relay driving circuit 40, a trigger 50, a timing sequence control circuit 60, and a power output interface 70. The power supply saving system 100 may be used to conserve energy for a computer motherboard.

The power input interface 10 is connected to the power output interface 70 via a neutral line N, a ground line G, and a hot line L, which is configured to connect to an external power source to receive an external AC power signal, such as a 220V AC power signal, and supply the external AC power signal to the power supply 80 via the power output interface 70. The power supply 80 includes a power conversion circuit, which can convert the AC power signal from the external power source to DC power signals. The DC power signals may include a 5V system power signal and a 5V standby power signal, to supply the DC power signals to a computer motherboard 90 of a computer. The AC/DC converter 20 receives and converts the AC power signal to a DC power signal to supply power to the relay 30, the relay driving circuit 40, and the trigger 50. The relay 30 includes a switch K connected to the hot line L between the power input interface 10 and the power output interface 70. The timing sequence control circuit 60 includes three input terminals and two output terminals. The input terminals are configured to connect to a power-on signal pin, a power-off signal pin, and a 5V system power pin of the computer motherboard 90. One output terminal is connected to the trigger 50 and the other output terminal is connected to the relay driving circuit 40.

When the computer is turned off, the timing sequence control circuit 60 receives a power-off signal from the power-off signal pin of the computer motherboard 90. However, the 5V system power pin of the computer motherboard 90 still outputs a 5V system voltage to later to turn the computer on quickly. The timing sequence control circuit 60 triggers the trigger 50 to control the relay driving circuit 40 to turn off the relay switch K. The connection between the external power source and the power supply 80 via the power input interface 10 and the power output interface 70 is cut off. Thus, the power supply 80 will not output the 5V system voltage and the 5V standby voltage to the computer motherboard 90.

When the timing sequence control circuit 60 receives a power-on signal from the power-on signal pin, the 5V system power pin of the computer motherboard 90 does not output any voltage. The timing sequence control circuit 60 triggers the trigger 50 to control the relay driving circuit 40 to turn on the relay switch K. The external power source is connected to the power supply 80 via the power input interface 10 and the power output interface 70.

Figure 2:
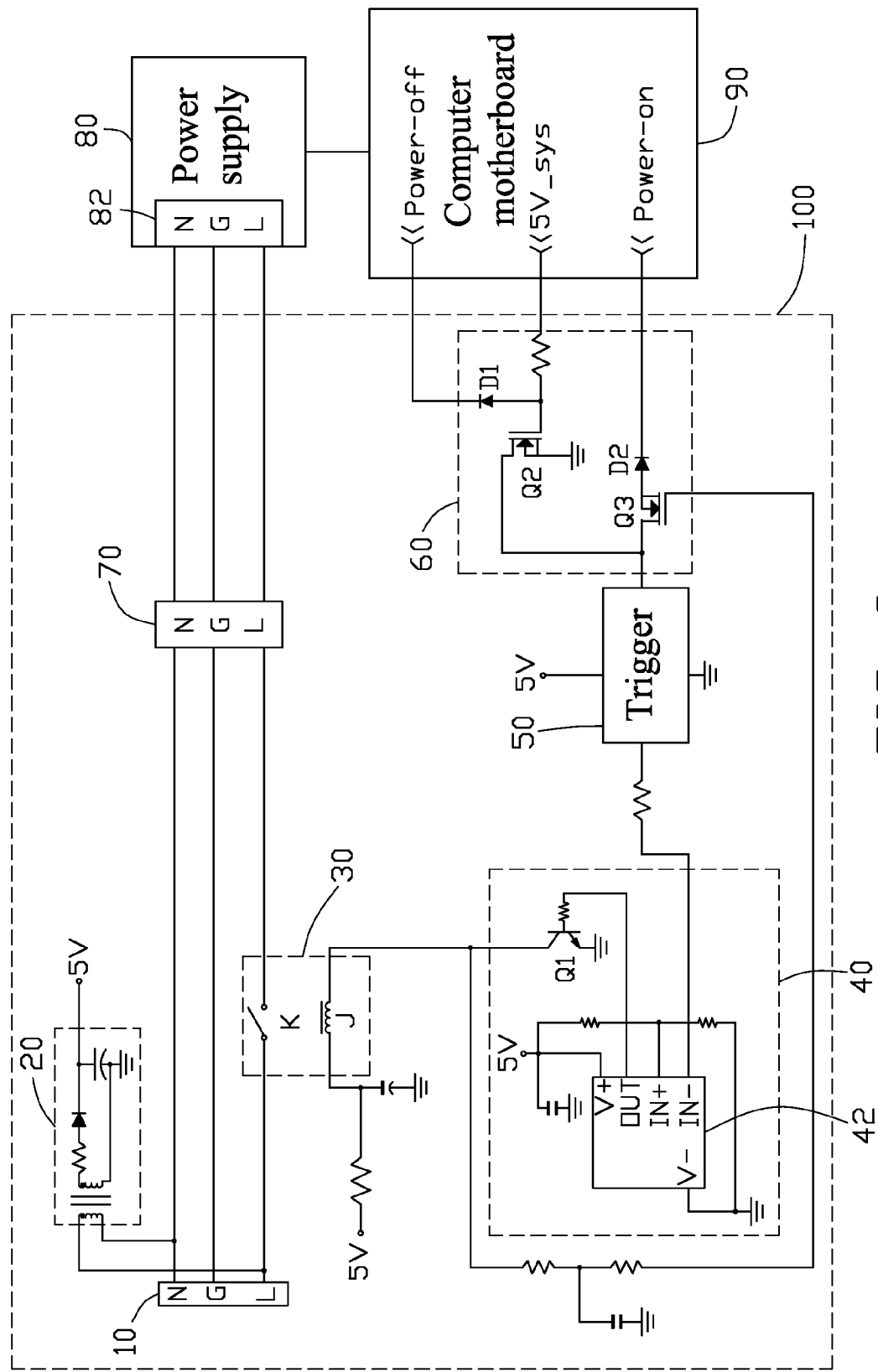
FIG. 2 is a circuit diagram of one embodiment of the power supply saving system of FIG. 1.

Referring to FIG. 2, the relay driving circuit 40 includes a transistor Q1, a comparator chip 42. The relay 30 further includes a coil J. The timing sequence control circuit 60 includes two field effect transistors (FETs) Q2 and Q3, and two diodes D1 and D2 having a protecting function.

A first terminal of the coil J of the relay 30 is connected to a 5V power terminal of the AC/DC converter 20, to receive a 5V voltage. A second terminal of the coil J is connected to a collector of the transistor Q1 and a gate of the FET Q3. An emitter of the transistor Q1 is grounded. A base of the transistor Q1 is connected to an output pin OUT of the comparator chip 42. An input pin IN— of the comparator chip 42 is connected to a first terminal of the trigger 50. A second terminal of the trigger 50 is connected to the drains of the FETs Q2 and Q3. A gate of the FET Q2 is connected to an anode of the diode D1 and the 5V system power pin of the computer motherboard 90. A source of the FET Q2 is grounded. A cathode of the diode D1 is connected to the power-off signal pin. A source of the FET Q3 is connected to an anode of the diode D2. A cathode of the diode D2 is connected to the power-on signal pin.

In use, an initial state of the trigger 50 is at a high level, such as about 5V for example. If a power switch of the computer motherboard 90 is turned on, the power-on signal pin outputs a low level turn-on signal to the source of the FET Q3. The FET Q3 is turned on and outputs a low level signal, such as about 0 V for example, to the trigger 50 to change the trigger 50 from the high level to a low level. The trigger 50 outputs the low level signal to the input pin IN— of the comparator chip 42. The output pin OUT of the comparator chip 42 outputs a high level signal to turn on the transistor Q1. The collector of the transistor Q1 outputs a low level signal. The relay 30 receives the low level signal. The switch K of the relay 30 is turned on. The external power source supplies power to the power supply 80 via the power input interface 10 and the power output interface 70.

If the computer motherboard 90 is turned off using software, the power-off signal pin outputs a high level turn-off signal and the system power pin 5V_sys still outputs 5V voltage to turn on the FET Q2. The FET Q2 outputs a low level signal to change the trigger 50 from the low level to the high level. The trigger 50 outputs the high level signal to the input pin IN- of the comparator chip 42. The output pin OUT of the comparator chip 42 outputs a low level signal to turn off the transistor Q1. The switch K is turned off. The connection between the external power source and the power supply 90 is cut off. The power supply 80 will not output the 5V system power and the 5V standby power to the computer motherboard 90, which saves electricity.

In one embodiment, the comparator chip 42 is an LM358, and the trigger 50 is a D-type flip-flop. Voltage of the trigger 50 can be changed from a high low or from low to high when it receives a low level signal. In other embodiments, the trigger 50 can be replaced by a trigger having other triggering conditions.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A power supply saving system comprising:
   a power input interface configured to receive an external alternating current (AC) power signal;
   a power output interface configured to output the AC power signal from the power input interface;
   a relay comprising a relay switch, the relay switch connected between the power input interface and the power output interface;
   a relay driving circuit configured to drive the relay;
   a trigger configured to trigger the relay driving circuit;
   an alternating current/directing current (AC/DC) converter configured to receive the AC power signal from the power input interface, to transform the AC power signal to a DC power signal to supply power for the relay, the relay driving circuit, and the trigger; and
   a timing sequence circuit;
   wherein the timing sequence circuit is capable of controlling the relay driving circuit via the trigger to turn on the relay switch to connect the power input interface to the power output interface in response to the timing sequence circuit receiving a power-on signal from a motherboard of a computer; and
   the timing sequence circuit is capable of controlling the relay driving circuit via the trigger to turn off the relay switch to cut off connection between the power input interface and the power output interface in response to the timing sequence circuit receiving a power-off signal.

2. The power supply saving system of claim 1, wherein the relay driving circuit comprises a transistor and a comparator chip; the relay switch is connected to a hot line between the power input interface and the power output interface; the relay further comprises a relay coil connected between the AC/DC converter and a collector of the transistor; an emitter of the transistor is grounded, a base of the transistor is connected to an output pin of the comparator chip, and an input pin of the comparator chip is connected to the timing sequence circuit via the trigger.

3. The power supply saving system of claim 2, wherein the timing sequence circuit comprises a first field-effect transistor (FET) and a second FET; the collector of the transistor is connected to a gate of the second FET, the trigger is connected to drains of the first and second FETs, a gate of the first FET gate is connected to a system power pin and a power-off signal pin, a source of the first FET is grounded, a source of the second FET is connected to a power-on signal pin.

4. The power supply saving system of claim 3, further comprising a diode connected between the first FET gate and the power-off signal pin.

5. The power supply saving system of claim 3, further comprising a diode connected between the second FET source and the power-on signal pin.

6. A power supply saving system comprising:
   a power input interface configured to receive an external alternating current (AC) power;
   a power output interface configured to output the AC power signal;
   a computer motherboard;
   a power supply connected to the power output interface to receive the AC power signal, and connected to the computer motherboard to supply power for the computer motherboard;
   a relay comprising a relay switch, the relay switch connected between the power input interface and the power output interface;
   a relay driving circuit configured to drive the relay;
   a trigger configured to trigger the relay driving circuit;
   an alternating current/directing current (AC/DC) converter configured to receive the AC power signal from the power input interface, the AC/DC converter capable of transforming the AC power signal to a DC power signal to supply power to the relay, the relay driving circuit, and the trigger; and
   a timing sequence circuit;
   wherein the timing sequence circuit is capable of controlling the relay driving circuit via the trigger to turn on the relay switch to transmit the AC power signal to the power supply to power the computer motherboard via the power input interface and the power output interface in response to the timing sequence circuit receiving a power-on signal from the computer motherboard; and
   the timing sequence circuit is capable of controlling the relay driving circuit via the trigger to turn off the relay switch to stop transmitting the AC power signal to the power supply in response to the timing sequence circuit receiving a power-off signal from the computer motherboard.

7. The power supply saving system of claim 6, wherein the relay driving circuit comprises a transistor and a comparator chip; the relay switch is connected to a hot line between the power input interface and the power output interface; the relay further comprising a relay coil connected to the DC power signal from the AC/DC converter and to a collector of the transistor; an emitter of the transistor is grounded, a base of the transistor is connected to an output pin of the comparator chip, and an input pin of the comparator chip is connected to the timing sequence circuit via the trigger.

8. The power supply saving system of claim 7, wherein the timing sequence circuit comprises a first field-effect transistor (FET) and a second FET; the collector of the transistor is connected to a second FET gate, the trigger is connected to drains of the first and second FETs, a gate of the first FET is connected to a system power pin of the computer motherboard and a power-off signal pin of the computer motherboard, a source of the first FET is grounded, a source of the second FET is connected to a power-on signal pin of the computer motherboard.

9. A power supply saving system for conserving energy supplied to a computer motherboard from a power supply, the power supply saving system comprising:
   a power input interface configured to receive an external alternating current (AC) power;
   a power output interface configured to output the AC power signal to the power supply;
   a switch circuit connected between the power input interface and the power output interface; and
   a control circuit connected to the computer motherboard; and
   an alternating current/directing current (AC/DC) converter configured to receive the AC power signal from the power input interface, to transform the AC power signal to a DC power signal to supply the DC power signal to the switch circuit and the control circuit;

wherein the control circuit is capable of controlling the switch circuit to connect the power input interface to the power output interface in response to the control circuit receiving a power-on signal from the computer motherboard; and the control circuit is capable of controlling the switch circuit to cut off connection between the power input interface and the power output interface in response to the control circuit receiving a power-off signal from the computer motherboard.

10. The power supply saving system of claim 9, wherein the switch circuit comprises a relay; the relay comprises a relay switch and a relay coil; the relay switch is connected between the power input interface and the power output interface; the relay coil is controlled by the control circuit.

11. The power supply saving system of claim 10, wherein the control circuit comprises a relay driving circuit configured to drive the relay, a trigger configured to trigger the relay driving circuit, and a timing sequence circuit configured to control the relay driving circuit via the trigger to turn on or off the relay switch.

12. The power supply saving system of claim 11, wherein the relay driving circuit comprises a transistor and a comparator chip; the relay switch is connected in a hot line between the power input interface and the power output interface; the relay further comprising a relay coil connected to the DC power signal from the AC/DC converter and to a collector of the transistor; an emitter of the transistor is grounded, a base of the transistor is connected to an output pin of the comparator chip, and an input pin of the comparator chip is connected to the timing sequence circuit via the trigger.

13. The power supply saving system of claim 12, wherein the timing sequence circuit comprises a first field-effect transistor (FET) and a second FET; the collector of the transistor is connected to a gate of the second FET, the trigger is connected to drains of the first and second FETs, a gate of the first FET is connected to a system power pin of the computer motherboard and a power-off signal pin of the computer motherboard, a source of the first FET is grounded, a source of the second FET is connected to a power-on signal pin of the computer motherboard.

\* \* \* \* \*